US009007335B2

(12) United States Patent
Cronin et al.

(10) Patent No.: US 9,007,335 B2
(45) Date of Patent: Apr. 14, 2015

(54) TOUCH-SENSING SYSTEMS

(75) Inventors: Ivan Cronin, Cambridge (GB); Nicholas Simon Terry, Cambridge (GB); Philip Moyse, Cambridge (GB); Edward Simons, Cambridge (GB); Steven Paul Farmer, Cambridge (GB)

(73) Assignee: Plastic Logic Limited, Cambridge (GB)

( * ) Notice: Subject to any disclaimer, the term of this patent is extended or adjusted under 35 U.S.C. 154(b) by 278 days.

(21) Appl. No.: 13/520,333

(22) PCT Filed: Dec. 21, 2010

(86) PCT No.: PCT/GB2010/052171
§ 371 (c)(1),
(2), (4) Date: Mar. 28, 2013

(87) PCT Pub. No.: WO2012/066304
PCT Pub. Date: May 24, 2012

(65) Prior Publication Data
US 2013/0201146 A1    Aug. 8, 2013

(51) Int. Cl.
*G06F 3/045* (2006.01)
*G06F 3/044* (2006.01)
(Continued)

(52) U.S. Cl.
CPC .............. *G06F 3/044* (2013.01); *G06F 3/0412* (2013.01); *G09G 3/344* (2013.01); *G06F 3/0416* (2013.01)

(58) Field of Classification Search
CPC ..... G06F 3/044; G06F 3/0412; G06F 3/0416; G09G 3/344
USPC ..................... 345/156–184; 178/18.01–18.06; 324/662; 359/291; 200/5 A
See application file for complete search history.

(56) References Cited

U.S. PATENT DOCUMENTS

| 6,492,979 B1* | 12/2002 | Kent et al. ..................... 345/173 |
| 2003/0011583 A1* | 1/2003 | Yamazaki ..................... 345/204 |
| 2005/0179671 A1* | 8/2005 | DeGroot et al. ............... 345/173 |

(Continued)

FOREIGN PATENT DOCUMENTS

RU    2007112048 A    10/2008

OTHER PUBLICATIONS

Miles, M. et al, "Digital Paper for Reflective Displays", Journal of the Society for Information Display, Jan. 1, 2003, pp. 209-215, vol. 11, No. 1.

(Continued)

*Primary Examiner* — Prabodh M Dharia
(74) *Attorney, Agent, or Firm* — Knobbe, Martens, Olson & Bear, LLP

(57) ABSTRACT

A method of projected capacitance touch sensing on a display includes updating the display by applying a drive waveform to each pixel of the display over a plurality of frame periods to update a pixel state. The updating includes selecting each row of the display in turn and repeating a frame update to drive pixels with successive time slices of the drive waveforms. The method further includes sensing a signal from a projected capacitance touch sensing electrode of the display during a sensing interval to provide a touch sensing response; identifying when column drive levels of the drive waveforms for pixels of one selected row change by more than a threshold level between the selected row and a next selected row; and inhibiting the touch sensing responsive to the column drive row change signal indicating a greater than the threshold level change of the drive levels between the selected rows.

24 Claims, 5 Drawing Sheets

(51) Int. Cl.
*G06F 3/041* (2006.01)
*G09G 3/34* (2006.01)

(56) References Cited

U.S. PATENT DOCUMENTS

| | | | |
|---|---|---|---|
| 2007/0034423 A1 | 2/2007 | Rebeschi et al. | |
| 2007/0040814 A1* | 2/2007 | Lee et al. | 345/173 |
| 2008/0143683 A1 | 6/2008 | Hotelling | |
| 2008/0158183 A1 | 7/2008 | Hotelling et al. | |
| 2008/0162996 A1* | 7/2008 | Krah et al. | 714/27 |
| 2008/0196945 A1* | 8/2008 | Konstas | 178/18.03 |
| 2008/0278178 A1* | 11/2008 | Philipp | 324/662 |
| 2009/0066669 A1 | 3/2009 | Olson | |
| 2009/0073135 A1* | 3/2009 | Lin et al. | 345/173 |
| 2009/0153509 A1 | 6/2009 | Jiang et al. | |
| 2009/0194344 A1* | 8/2009 | Harley et al. | 178/18.06 |
| 2009/0284495 A1* | 11/2009 | Geaghan et al. | 345/174 |
| 2010/0013791 A1* | 1/2010 | Haga et al. | 345/174 |
| 2010/0252335 A1* | 10/2010 | Orsley | 178/18.03 |
| 2011/0050585 A1* | 3/2011 | Hotelling et al. | 345/173 |
| 2011/0090169 A1* | 4/2011 | Karhiniemi | 345/173 |
| 2011/0096025 A1* | 4/2011 | Slobodin et al. | 345/174 |
| 2011/0141052 A1* | 6/2011 | Bernstein et al. | 345/174 |
| 2011/0149375 A1* | 6/2011 | Kothari et al. | 359/291 |
| 2011/0281070 A1* | 11/2011 | Mittal et al. | 428/142 |
| 2012/0105370 A1* | 5/2012 | Moore | 345/174 |
| 2013/0009907 A1* | 1/2013 | Rosenberg et al. | 345/174 |
| 2013/0126325 A1* | 5/2013 | Curtis et al. | 200/5 A |
| 2013/0176281 A1* | 7/2013 | Hotelling et al. | 345/174 |
| 2013/0285986 A1* | 10/2013 | Haga et al. | 345/175 |

OTHER PUBLICATIONS

International Search Report and Written Opinion issued in PCT Application No. PCT/GB2010/052171, mailed Apr. 12, 2013, in 11 pages.

Decision on Grant issued on Russian Application No. 2012133456 dated Aug. 26, 2014.

* cited by examiner

TOUCH-SENSING SYSTEMS

Cross-Reference to Related Applications

This application is the U.S. National Phase under 35 U.S.C. §371 of International Application No. PCT/GB2010/052171, filed Dec. 21, 2010, designating the United States and published in English on Jul. 7, 2011, as WO 2011/080513, which claims priority to United Kingdom Application No. 1000023.0, filed Jan. 4, 2010.

FIELD OF THE INVENTION

This invention generally relates to techniques for employing projected capacitance touch sensing on a display screen, in particular, but not exclusively, on an electrophoretic display screen. Embodiments of the technique are particularly useful for electronic document reading devices. More specifically, the invention relates to a method of projected capacitance touch sensing on a display screen, an electronic device having a display screen in conbination with a projected capacitance touch sensor over said display screen, and touch-sensitive displays.

BACKGROUND TO THE INVENTION

Electrophoretic display screens have many advantages for electronic reading devices because they are able to provide a thin and non-volatile display. However combining a display screen such as an electrophoretic display screen with a capacitance-based touch sensor presents particular problems because the voltage swings involved can easily couple to the grid of electrodes used for touch sensing. These problems are particularly acute in large screen devices with fine resolution touch sensing, since these involve a touch sensing grid with large numbers of electrodes, which can easily pick up noise. There are special problems associated with capacitive touch sensing displays as compared with, say, resistive touch sensing, because voltages on the backplane can be induced onto the touch sensing electrodes, which in turn causes a change in voltage on the electrode capacitance which simulates the effect of touch (which makes a small change to the electrode capacitance).

We are particularly concerned with display screens in which a touch sensing layer or layers including touch sensing electrodes is located adjacent to, for example, laminated over, an electrophoretic display screen which, in turn, is driven by a backplane behind the electrophoretic medium. In some preferred devices the backplane is fabricated using solution based thin film transistors (TFTs), preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 (which describes a four or five layer pixel architecture) and PCT/GB2006/050265, all hereby incorporated by reference in their entirety. Thus in embodiments the TFTs comprise an organic semiconductor material, for example a solution processable conjugated polymeric or oligomeric material, and in embodiments the display, more particularly the backplane, is adapted to solution deposition, for example comprising solution-processed polymers and vacuum-deposited metals.

We describe an example touch sensing electrophoretic display screen structure later. One potential solution to the problem of noise from the electrophoretic display screen is to interpose a transparent conductive layer between the electrophoretic screen and the projected capacitance touch sensor, but in practice this suffers from problems: a layer of sufficient conductivity tends to tint the display colour and/or diminish its brightness, and the additional electrode plane in effect provides a significant capacitance in parallel with the capacitive touch sensor. Therefore the effective change in capacitance in touching the sensor is reduced, thus reducing the touch sensing sensitivity. Moving the conductive layer away from the touch sensing electrodes reduces this effect but also reduces the effectiveness of the shielding.

There therefore exists a need for improved approaches to implementing a projected capacitance touch sensor on a display screen, in particular on an electrophoretic display screen.

SUMMARY OF THE INVENTION

According to a first aspect of the invention there is therefore provided a method of projected capacitance touch sensing on a display screen, the method comprising: updating said display screen by applying a drive waveform to each pixel of the display screen over a plurality of frame periods, wherein a said drive waveform for a pixel defines a transition of the pixel from a current pixel state to an updated pixel state over said plurality of frame periods, and wherein said updating comprises selecting each row of said display screen in turn for a row driving period and driving columns of the display screen with a time slice of drive waveforms for pixels of the row to perform a frame update of said display screen, and repeating said frame update to drive pixels of said display screen with a plurality of successive time slices of said drive waveforms to drive said pixels with said drive waveforms; sensing a signal from a projected capacitance touch sensing electrode of said display screen during a sensing interval, and using said sensing to provide a touch sensing response; identifying when column drive levels of said drive waveforms for pixels of one selected row change by more than a threshold level between said one selected row and a next selected row to provide a column drive row change signal; and inhibiting said touch sensing responsive to said column drive row change signal indicating a greater than said threshold level change of said column drive levels from said one selected row to said next selected row during said sensing interval.

An advantage of an embodiment is to enable false touch events triggered by intense display activity to be ignored by touch system. More specifically, a related advantage of an embodiment may be to reduce the effect on touch sensing of noise caused by edges of display drive transitions, e.g., noise caused by a change in a column drive level during a touch sensing interval, for example when the column drive level changes for pixels of two consecutive rows. In this regard, the sensing interval may have a duration of one or more of said row driving periods, or may be less than such a period.

The display screen is preferably electrophoretic, but may alternatively be any type of display known to the skilled person, e.g., electrowetting, LCD, LED, Plasma, etc.

There may be no geographical relationship between where, e.g., on which column and/or between which rows or pixels, the threshold is exceeded on the display screen and where on the touch system (e.g., on which of a plurality of touch sensor electrodes) the noise is coupled to and preferably rejected. For example, any threshold exceeding display event may cause touch on the whole display to be disabled for the duration of the current row (line) update.

In embodiments, broadly speaking a frame access time (FAT) defines time slots for PWM (pulse width modulation) driving waveforms for the display screen. A typical FAT may be of order 20-40 ms. Within each frame each row of the display screen is selected in turn and the column lines of the display screen are driven with a voltage defined by a PWM waveform configured to transition the pixel from its current state to its updated state. (The skilled person will appreciate that it is arbitrary which electrodes of the display screen are labelled as rows and which are labelled as columns).

In an example embodiment of a display screen each pixel of the display screen has an associated pixel circuit comprising a thin film transistor, in particular a field effect transistor (FET), and a pixel capacitor for storing a voltage value applied to the pixel. For example in embodiments a row select line may be coupled to a gate connection of a pixel transistor and a column line to a source or drain connection. However the skilled person will appreciate that other switching configurations are possible and that, for example, a select line may be coupled to a drain/source connection rather than a gate connection.

As previously mentioned, within a frame address time each row may be addressed in turn to write a time slice portion of the PWM waveform for a pixel, more particularly for pixels of the row. A typical line address time (LAT) may be, for example, of order 20-40 μs. In this way within a frame period the relevant time slice of the PWM waveform for each pixel in each row is written before a further frame period commences to write the next time slice of the PWM drive waveform for each pixel.

Those skilled in the art will be aware of many examples of drive waveforms which may be employed. This specification is not concerned with details of any particular drive waveforms which may be employed for driving any type of display screen, e.g., electrophoretic. However it is useful to outline an example, to aid in understanding the operation of embodiments of the invention. Thus, for example, a PWM drive waveform may have three phases, a first phase in which each pixel of the display screen is converted to a first intermediate display level, for example "white", a second phase in which each pixel is transformed to a second intermediate display level, for example "black", and a third phase in which the display levels of the pixels are then set at respective desired levels, for example on a greyscale between black and white. One reason that an electrophoretic display screen may be driven in this manner is because the first intermediate ("white") level may not be well defined, depending upon the starting display level of a pixel (and possibly its history). By taking a pixel from its initial state through white and then black (or vice-versa) to its final state a well-defined transition from the second intermediate level ("black") to the final state may be provided. For example the first phase, to "white" may employ a voltage of, say, +15 volts; the second phase, to "black" may employ a voltage of, say, −15 volts, and an example, third phase to a display level of, say, light grey, may employ a voltage of, say, +15 volts for a reduced duration as compared with that used to achieve white (for example 120 ms versus 180 ms). The skilled person will appreciate that the polarities and voltages and intermediate display level "colours" are given by way of example only.

Further, in practice PWM waveforms may employ more than two different voltage levels, for example, employing a zero voltage level or intermediate voltage levels such as +/−8 volts, +/−4 volts and so forth. Thus although it is convenient to describe an example of a PWM waveform to aid in understanding embodiments of the invention, the techniques we describe are not limited to this type of drive and may be employed with a multi-level PWM-type waveform or an analogue drive waveform (for example, for greater greyscale precision).

One approach to reducing the effects of noise in a projected capacitance touch sensing electrophoretic display might be to inhibit the output from the touch sensing module when the column lines are changing most, that is in the first phase of the drive waveform (when the starting display level is unknown) and in the third phase (when the final pixel display level is unknown). However electrophoretic display screens have a relatively slow update and each waveform phase may have a duration of, for example, approximately 250 ms so that this approach would effectively render the touch sensing inoperative for 0.5 seconds out of every 0.75 seconds, creating a poor user experience.

The inventors have recognised that substantially improved performance may be achieved by monitoring the column drive level to a display screen, in particular an electrophoretic display screen, on a different timescale, e.g., an LAT-based timescale (in effect row-by-row). In embodiments the touch sensing is performed during a touch sensing interval. The touch sensing interval may span one or multiple row drive (LAT) periods (for example, 80 μs compared with an LAT period of, say, 20 μs-40 μs), but more preferably a touch sensing interval is less than a single LAT time. This is because noise desired to be avoided in an embodiment may be caused at the instant the data presented to the display pixels is changed (i.e., at the instant of a transition on a column), so that the touch detection does not have to be a number of LAT times and could be less than a single LAT time. In this regard, the sensing period and its relation to the LAT may be of less interest than the addressing of a new display screen row during the sensing period.

In an embodiment implementing the row-by-row approach, when each new row is addressed the degree of change on the column drive electrodes is compared with a threshold. If greater than the threshold then it is presumed that noise is being/will have been/is about to be induced into the projected capacitance touch sensor and the sensing during this time interval should be disregarded and, in embodiments, the sensing is repeated until the threshold is no longer exceeded. In embodiments if any of the rows involves a change in the column drive of greater than a threshold the touch sensing during the overlapping touch sensing interval is disregarded.

One might imagine that such an approach could result in the touch sensing signal always being disregarded but in practice it has been found that although sometimes the touch sensing may be repeated more than once, multiple repetitive inhibitions of the touch sensing are rare and there is little or no detriment to the user experience. In particular the user experience is enhanced because of the fine granularity of the time scale on which the touch sensing inhibition operates.

The algorithm used to determine the level of change of the column drive signals and its associated threshold value is preferably determined based on a balance between touch sensitivity and noise suppression, for example by systematic experiment. Various techniques may be employed. For example in one approach where the signals on the column lines may be driven at any instant with one of three voltages +15V, 0V or −15V, a weighted sum of differences between successive sets of data is calculated for each selected row, in particular in a weighted sum in which, for example, no change has a weight of 0, +15 volts to −15 volts (or vice versa) has a weight of 2 and + or −15 volts to 0 (or vice versa) has a weight of 1. In this example the threshold value may be equal to a number of columns of the display screen (for example 1280) so that the threshold corresponds to all of the lines changing by half the maximum excursion (15 volts) or more than half the lines changing by the maximum excursion (30 volts). In another approach the column drive level signals may be fed as serial data into an FIR (finite impulse response) or IIR (infinite impulse response) filter to, in effect, move a window over the column lines. This approach weights changes in which a number of relatively close or adjacent column lines change at the same time, on the basis that a number of column lines within a small region changing together will tend to induce more noise, than a similar number of lines changing over a greater physical area In embodiments the detection of the level of column drive change may be performed by monitoring column drive signals to the display screen, although in principle this detection could be performed at an earlier stage, for example based upon the input image. This may be employed to provide an inhibition signal for use by a touch sensing module. An example touch sensing circuit may be implemented in a Cypress® PSoC touch sensing integrated circuit, which is software configurable. Thus in an embodiment the touch sensing IC is configured to perform and discard a first touch sensing interrogation (for example lasting 80 μs), in order to synchronise an internal electrode multiplexer, and then to use a second touch sensing interval to reset an internal baseline (because of associated capacitance), and then to perform touch sensing in a third sensing interval (for example of 80 μs) The inhibition signal may be provided to the touch sensing integrated circuit so that if this is detected during the third touch sensing interval, said interval is repeated as often as necessary in order to obtain a reliable touch sensed signal output, which may be provided in terms of a detected XY touch position on the display screen.

As previously mentioned, embodiments of the above described techniques are particularly useful, but not limited to, addressing problems associated with large electrophoretic display screens, for example having a lateral diagonal dimension of at least 25 cm, in particular with high resolution touch sensing electrodes, for example better than 2 mm or better than 1 mm precision. In embodiments the touch sensing electrodes are within 2 mm of the electrophoretic display screen, more particularly of the electrophoretic display screen backplane.

In a related aspect the invention provides an electronic device having a display screen in combination with a projected capacitance touch sensor over said display screen, the device comprising: a display screen driver for updating said display screen by applying a drive waveform to each pixel of the display screen over a plurality of frame periods, wherein a said drive waveform for a pixel defines a transition of the pixel from a current pixel state to an updated pixel state over said plurality of frame periods, wherein said driver is configured to select each row of said display screen in turn for a row driving period and to drive columns of the display screen with a time slice of drive waveforms for pixels of the row to perform a frame update of said display screen, and wherein said driver is further configured to repeat said frame update to drive pixels of said display screen with a plurality of successive time slices of said drive waveforms to drive said pixels with said drive waveforms; a touch sensing module for sensing a signal from a projected capacitance touch sensing electrode of said display screen during a sensing interval, said touch sensing module being configured to provide a touch sensing response; means for identifying when column drive levels of said drive waveforms for pixels of one selected row change by more than a threshold level between said one selected row and a next selected row to provide a column drive row change signal; and means for inhibiting said touch sensing responsive to said column drive row change signal indicating a greater than said threshold level change of said column drive levels from said one selected row to said next selected row during said sensing interval.

Any combination of one or more of the optional features of the first, method aspect may be provided correspondingly in this related, device aspect. For example, the display screen may be of any type, and is preferably electrophoretic.

In a further aspect, the invention provides a touch-sensitive display comprising: a display screen comprising pixels, at least one column electrode and a plurality of row electrodes; a projected capacitance touch sensor over said display screen; touch sensor circuitry to read at least one output from said touch sensor to detect touch of said device; a display image controller to apply at least one column drive signal to the at least one column electrode over a plurality of frame address times and sequentially select said row electrodes within each said frame address time to update each said pixel from a first state to a second state according to image data; touch response circuitry to control said display screen in response to a said touch detection; touch validator circuitry to output a touch detection validity signal dependent on said image data, said touch detection validity signal indicating at least one change of the at least one column drive signal between row address times within a said frame address time; and a touch response controller to inhibit a said response by said touch response circuitry to a said touch detected on the basis of said at least one read touch sensor output, said inhibit dependent on said touch detection validity signal.

The touch response circuitry may be, or be comprised in, the display image controller. Thus, the display image controller may update a displayed image in response to a touch detection.

The display screen may be a matrix of pixels each writeable to by selecting one row electrode and one column electrode. The first and second pixel states may be defined directly by the image data, e.g., may correspond to successive subsets of image data, each subset defining a pixel state in a respective frame. The image data may be in or derived from any format, e.g., JPEG, MPEG, Tiff, Bmp, Gif, etc (such formats may need to be electronically processed to form pixel-by-pixel data to be input to the display image controller).

The inhibited response may be an update of a displayed image, and/or may be a response by the touch response circuitry when comprised in the display image controller or the touch response circuitry in the form of additional circuitry such as circuitry monitoring output of the display controller. The inhibit may involve disabling a said response and/or suppressing generation of a touch detection indication that would trigger a response.

The or each said change may be a change between successive row (line) address times. (The terms row address time and line address time are used interchangeably throughout this specification). The change may for example be a level transition between data bits on the column electrode (the data may be binary or m-ary where m>2, e.g., may be multi-level), such transitions arising in embodiments in parallel data applied to a bus coupled to a plurality of the column electrodes, or may be an increase or decrease in voltage on one or more of the column electrodes. Similarly, the change indication, which may be achieved by detection or prediction of change, may be achieved by setting a predetermined level or generating a transition of the touch detection validity signal, which may be a flag.

Each read touch sensor output may be from a respective touch sensor electrode. The touch sensor may have a plurality of such electrodes, e.g., at least two for detecting an x-location of touch and at least two for detecting a y-location of touch. Such electrodes may be read in turn, e.g., x1, x2, y1, y2.

The inhibition of the response to a touch detected on the basis of said at least one read touch sensor output may be achieved by discarding and repeating a touch sensor output read. Thus an indication of a detected touch to trigger the response may not occur until a non-discarded read has occurred on all relevant touch sensor electrodes (e.g., all electrodes of the touch sensor), the inhibition being achieved by inhibiting any indication of a detected touch that would have been based on the discarded read output.

The touch validator circuitry may be configured to indicate said at least one change on the basis of at least one said column drive signal (e.g., by monitoring voltage or data on a column electrode(s) to detect the at least one change) and/or said image data. In the latter case, the image data may be used to predict when a change will occur so that the touch detection validity signal can be set to inhibit the response at a later time.

The touch response controller may trigger a further said read of a said touch sensor output by said touch sensor circuitry in response to said touch detection validity signal. The read may be limited to being repeated once, e.g., after a predetermined time interval immediately following the first read or when the validity signal indicates that the read may be valid, or may be repeated a plurality of times until the validity signal indicates that the read may be valid or that the last read may have been valid.

The touch validator circuitry may indicate a plurality of changes of the at least one column drive signal, and output said touch detection validity signal on the basis of a change value dependent on said plurality of said changes. For example, the circuitry may indicate that a change has occurred on all or at least a predetermined plural number of columns between row address times. The change value may be a number (amount) of column electrodes on which change has/will occur, an average change, a weighted average change and/or a change density.

More specifically, the touch validator circuitry may associate (e.g., assign in memory, for example in a table of changes and coefficients) a weighting coefficient with each said change and calculate a value, e.g., sum or average (e.g., mode, median), on the basis of said coefficients, the touch validator circuitry further comprising a comparator to compare said calculated value to a threshold and to determine said touch detection validity signal on the basis of said comparison.

The inhibit of a said response to a said touch detection is preferably of duration less than or substantially equal to one or more, e.g., 1-5, said row address times within a said frame address time. The inhibit may immediately follow a change detection so that response to a touch sensor read concurrent with the change is suppressed. Alternatively or additionally, and for example where the change is predicted, e.g., by the display image controller, the assertion of the inhibit signal may precede the actual change in row data. This may be preferable in some instances, e.g., where there are processing delays in the touch system. Thus, the indicating of at least one change may indicate prediction or detection of such change(s).

As for the first aspect, the display screen is preferably an electrophoretic display screen, but may alternatively be any type of display screen known to the skilled person, e.g., electrowetting, LCD, LED, Plasma, etc.

In an aspect related to the above further aspect, a touch-sensitive display comprises: a display screen comprising pixels, at least one column electrode and a plurality of row electrodes; a projected capacitance touch sensor over said display screen; touch sensor circuitry to read at least one output from said touch sensor to detect touch of said device; a display image controller to apply at least one column drive signal to the at least one column electrode over a plurality of frame address times and sequentially select said row electrodes within each said frame address time to update each said pixel from a first state to a second state according to image data; touch response circuitry to control said display screen in response to a said touch detection; touch validator circuitry to output a touch detection validity signal dependent on said image data, said touch detection validity signal indicating at least one change of the at least one column drive signal between row address times within a said frame address time; and a touch response controller to delay at least one said read of an output from said touch sensor dependent on said touch detection validity signal.

Thus, the at least one read, e.g., of a touch sensor electrode, may be postponed until the touch detection validity signal indicates on the basis of predicted or detected changes on the column electrode(s) that a subsequently read touch sensor output may be valid (this differing from the above examples wherein sensing is repeated). Any combination of one or more of the optional features of the above said further aspect may be provided in this related aspect, e.g., the/each change being between successive LATs, the indication on the basis of change(s) of a plurality of column electrodes and/or using weighting coefficients, etc. Similarly for example, the display screen is preferably electrophoretic, and/or the touch response circuitry may be, or be comprised in, the display image controller, e.g, the display image controller may update a displayed image in response to a touch detection.

Methods corresponding to the above further aspect and to the aspect related to the above further aspect may be performed. For example, a method of projected capacitance touch sensing in a touch-sensitive display, the display comprising: a display screen comprising pixels, at least one column electrode and a plurality of row electrodes; a projected capacitance touch sensor over said display screen; touch sensor circuitry to read at least one output from said touch sensor to detect touch of said device; a display image controller to apply at least one column drive signal to the at least one column electrode over a plurality of frame address times and sequentially select said row electrodes within each said frame address time to update each said pixel from a first state to a second state according to image data; and touch response circuitry to control said display screen in response to a said touch detection, the method comprising: inhibiting a said response to a said touch, said inhibiting dependent on indication of at least one change of the at least one column drive signal between row address times within a said frame address time; and/or delaying at least one said read of an output from said touch sensor dependent on indication of at least one change of the at least one column drive signal between row address times within a said frame address time.

Preferred embodiments are defined in the appended dependent claims.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF PREFERRED EMBODIMENTS

Figure 1:
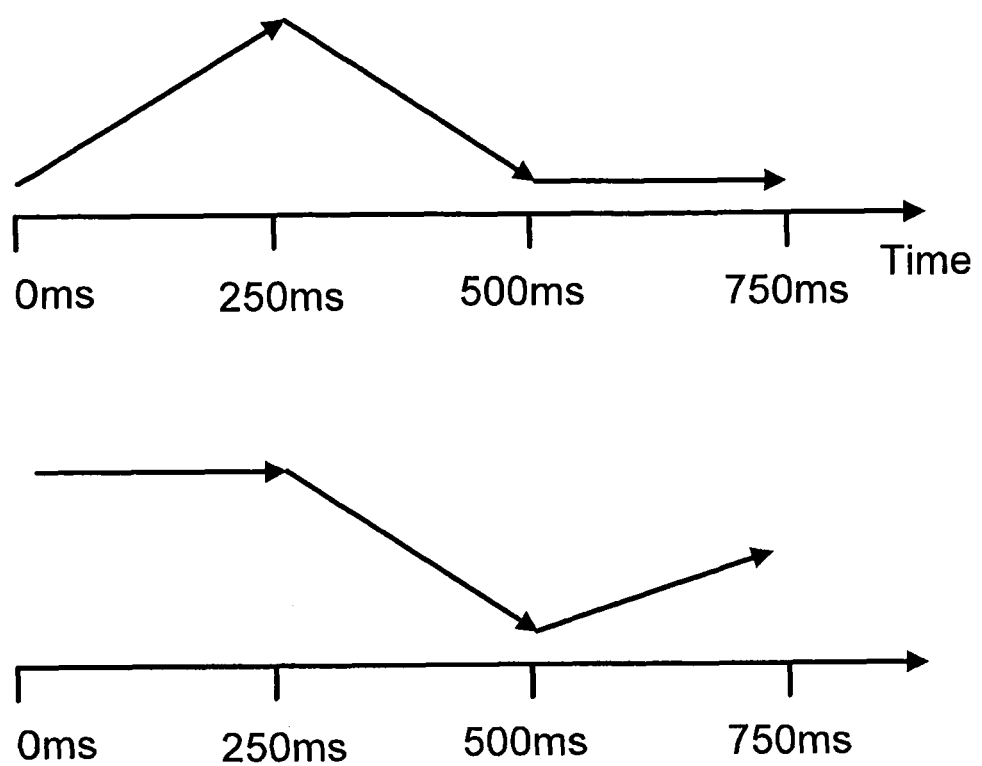
FIG. 1 shows example pixel colour transitions implemented in an embodiment (the term 'colour' being indicative throughout this specification of actual colour in a colour display or grey-level in a monochromatic display)

A display screen used in a touch-sensitive display embodiment may be electrophoretic. Such a display screen may have pixels each comprising a capsule containing a set of white particles and a set of black particles, the sets respectively charged positively or negatively. In order to display a required image, voltages are applied to layers associated with the capsules to attract or repel the required set of particles in each capsule as desired.

An embodiment may however use any other type of display screen, for example, colour (e.g., RGB) and/or electrowetting, LCD, LED, plasma or a different type of electrophoretic display. Thus, the particular waveforms applied to pixels in an embodiment may not be specific to an electrophoretic display or to a particular type of electrophoretic display.

The embodiment further comprises a projected capacitance touch sensor over the display screen, the sensor comprising a matrix having electrodes, e.g., arranged as rows and columns. The presence of an object such as a finger close to the surface of the sensor changes the local electrostatic field existing due to the voltage on the touch sensor matrix. A resulting change in projected capacitance at each point on the matrix can then be detected to determine the touch location. This may allow multi-touch operation.

The display screen comprises for example 1280 column electrodes and 960 row (line) electrodes, selection of each column and row electrode combination accessing a respective pixel. The pixel may comprise a transistor such as a thin film transistor (TFT) that provides a gated path to a capacitor, which is charged to hold a voltage for an associated display capsule. A row line (gate line) provides a path to the gate of the transistor and a column line (source line) provides a path to the source of the transistor. A signal(s) may be applied to the column line to update a corresponding pixel of a selected row to a desired colour state.

A technique for colour update of a capsule may involve a colour transition having one or more phases, e.g., a first to set the capsule to hard black, a second to set the capsule to hard white (or some other intermediate state, which may not be well-defined) and a third phase to update the capsule to the required colour (e.g., black, white or an intermediate level such as light or dark grey). Thus, regarding display of an image on a matrix of such capsules, the existing image is substantially erased in the first phase, the particles are reset in the second phase, and the required image is drawn in the third phase. Each pixel colour state may then be updated by generating a voltage on the pixel according to a drive waveform for the desired pixel colour transition.

Those skilled in the art will be aware of many examples of colour transition techniques and drive waveforms which may be applied in an embodiment depending on the display technology used, e.g., LCD, LED, electrophoretic, electrowetting etc. This specification is not concerned with details of any particular colour transition techniques or drive waveforms which may be employed for driving any particular kind of display screen. However it is useful to outline examples of colour transitions and corresponding drive waveforms, to aid in understanding the operation of embodiments of the invention.

Example colour transitions of two capsules are shown in FIG. 1, each transition being a three-stage transition. The capsule of FIG. 1(a) is updating from black to black (i.e., no colour change), whereas the capsule of FIG. 1(b) is updating from white to an intermediate grey-level between white and black. Both capsules pass through white at 250 ms and black at 500 ms before reaching the desired colour state at or before 750 ms. The vertical axis (not shown) of FIG. 1 may therefore correspond for example to a colour or grey-level scale, the horizontal axis indicating time as shown.

In the embodiment, the drive waveform, e.g., desired voltage transition for a pixel, may have a duration of about 0.75 seconds, each phase being of the order of 250 ms and spanning a plurality of frame address times (FATs). Each FAT spans a plurality of line address times (LAT; row address time). For example, each FAT may be of the order of 20 ms to 40 ms and each LAT may be of the order of 20 μs to 40 μs. Thus, all of the rows of the display screen may be scanned in turn within each FAT, which is preferably the minimum time it takes to update all of the rows of pixels, i.e., the LAT times the number of rows, e.g., 35 us×1000 rows=35 ms. As soon as the final row of pixels has been addressed, the first row may be addressed again in a following FAT. Moreover, the FAT may define the minimum time granularity of waveforms applied to the pixels.

Figure 2:
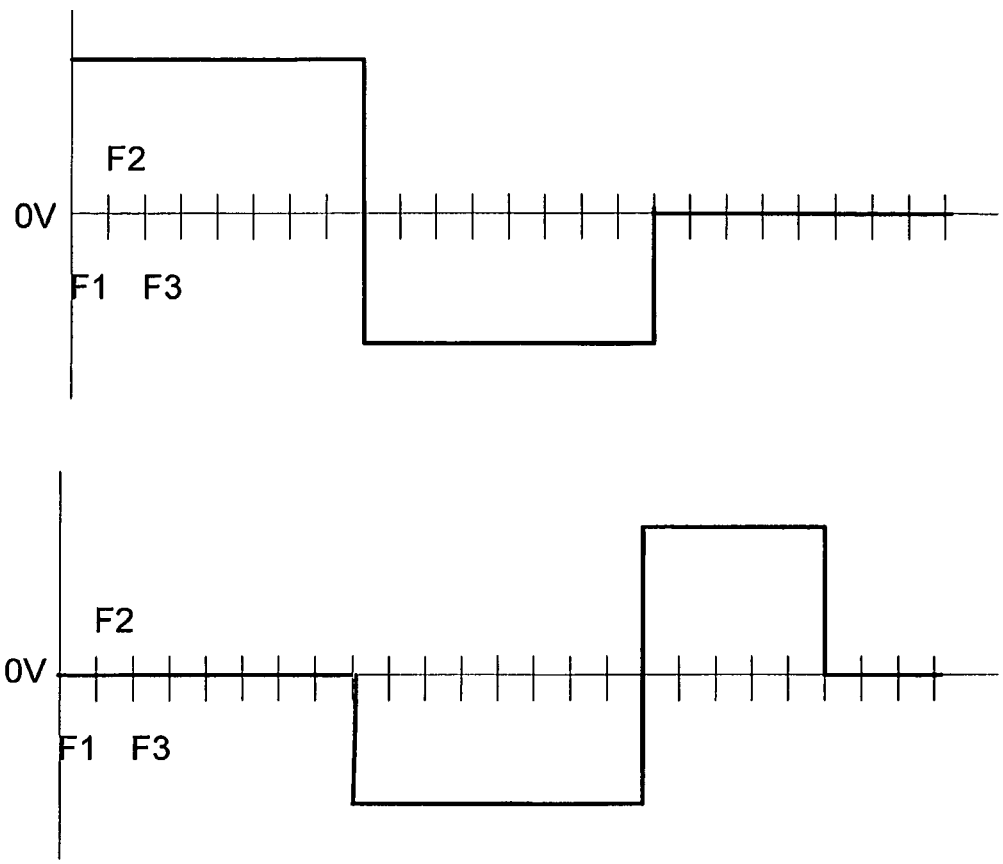
FIG. 2 shows drive waveforms corresponding to the colour transitions of FIG. 1.

FIG. 2, which is described in more detail below, shows how each drive waveform may comprise three phases each spanning a number, e.g., 8, of FATs (F1, F2, F3, etc.). The above time granularity is exploited when it is desired to drive the display screen medium, e.g. electrophoretic medium, to an intermediate level, as shown by the shorter pulse spanning 5 FATs in the third phase of FIG. 2(b). The vertical axis (not shown) of FIG. 2 may correspond for example to pixel drive voltage, the horizontal axis indicating time in units of FATs as shown.

Figure 3:
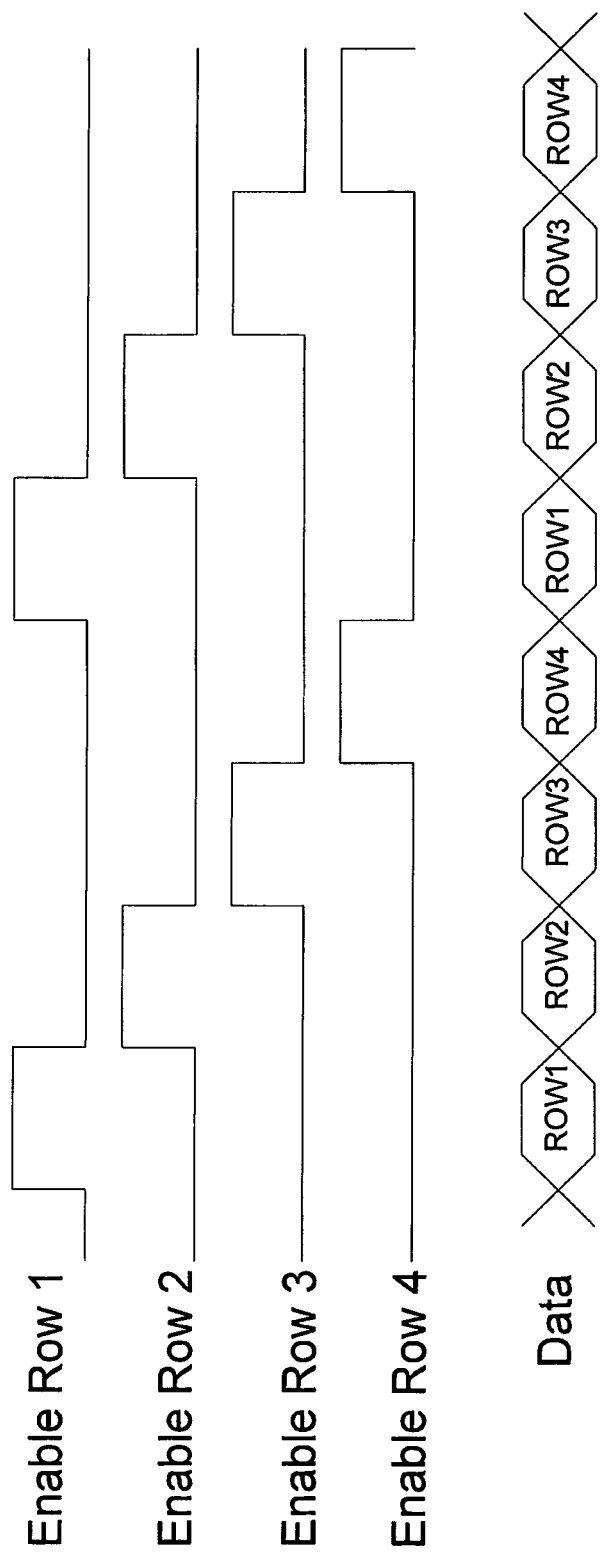
FIG. 3 shows row (line) scanning and synchronous application of data to column electrodes in the embodiment.

The above row scanning during a FAT means that pixels do not need to be addressed individually and all pixels of a row can be addressed in parallel during each LAT. (The length of each LAT allows for both a finite signal propagation time across the row and/or column electrodes, which may act like transmission lines, and sufficient time to charge up the pixel capacitor to the desired voltage level). Such row scanning is shown in FIG. 3, wherein each row, e.g. from top to bottom of the display screen, is scanned in succession and data for each row is applied to the column electrodes synchronous with the row selects. Each row is enabled for the duration of a LAT. The columns are in effect on an n-bit data bus, n being the number of columns. Each bit on the bus may have one of three states, e.g., +15V, 0V, −15V, though the number of states and/or voltage levels may be different in any modification of the embodiment.

A sensing operation to detect a signal on a selected touch sensor electrode may span e.g. 80 us and may thus span a subset of the plurality of LATs, e.g., 3 LATs. Alternatively, the sensing operation may span less than a LAT, since substantially instantaneous changes in column drive levels, for example caused by arrival of a LAT clock edge during a touch sensing operation, may be a/the primary cause of the interference. The touch sensor may have a single electrode or a plurality of electrodes, e.g., for x,y touch location detection as mentioned above.

A capacitance is provided with each pixel of a row to maintain a voltage applied during a LAT while the remaining rows are then scanned. In other words, the data or voltage level written to a pixel via a column electrode is held by a pixel capacitor, which substantially holds the pixel voltage at the +15V, 0V, −15V level. The capacitance may be additional to the intrinsic display screen capacitance, e.g., may be part of the display screen backplane.

Since the capacitance may partially discharge over time, regular refreshing of the pixel capacitances, e.g., periodic scanning of each line during each drive waveform phase may be required to top-up the charge on each capacitance. Preferably each capacitance substantially holds the required charge state throughout the duration of a FAT, the charge value on the capacitance being topped-up only for a small proportion, e.g., 1000th, of the FAT. With bistable display screens however, this operation may stop after the pixel reaches the required state; this may be the case in some electrophoretic embodiments.

In overview, the columns of the display screen are thus written with data in the following sequence:
Row 1, Frame 1
Row 2, Frame 1
Etc.
Row 1, Frame 2
Row 2, Frame 2
Etc.
Row 1, Frame m
Row 2, Frame m
Etc.
Row 1, Frame 1
Row 2, Frame 1
Etc.

As described in more detail below, the embodiment is generally concerned with the individual row to row transitions, i.e., change on column electrode(s) between successive LATs. For example, the embodiment may detect a change between data applied to row 2 in frame 3 in comparison to row 1 in frame 3 in order to determine whether a current or pending touch sensor output may be valid. If the data is significantly different a touch sense validity signal, e.g., flag, for a touch sensing controller, may be set to a predetermined state.

As indicated above, a drive waveform may be a pulse width modulated (PWM) waveform. The updated colour state of each pixel may be determined by the length of the pulse during the third phase, e.g., a length of a +15V pulse to change the pixel from hard black to a desired intermediate grey level. Thus, the time granularity of pulse width control may determine the greyscale resolution available. The time granularity in an embodiment is one or more FATs.

The example drive waveforms of FIGS. 2(a) and (b) correspond broadly to the colour transitions of FIGS. 1(a) and (b), respectively. Preferably, a voltage waveform of a pixel is substantially identical to such a drive waveform. This may be achieved by applying time slices of the drive waveform periodically to a capacitor that holds a voltage of the pixel. More specifically, when the row electrode associated with a pixel is selected during a LAT, a time slice (e.g., sample) of the drive waveform is applied to the associated column electrode. During intervening time periods between such LATs, the capacitor associated with that pixel substantially holds the voltage applied during the preceding LAT.

As indicated in FIG. 2, relatively large voltage transitions, e.g., between +15V and −15V, may be required in the embodiment to change the colour state of a pixel according to a drive waveform. Such voltages corresponding to the time slices of respective drive waveforms are applied serially to each column electrode synchronous with the scanning of the rows during each of the FATs of each phase. Successive time slices of a particular drive waveform for a pixel are applied in successive FATs, each time slice being for the duration of a LAT.

Regarding update of the entire display screen, the first phases of the drive waveforms of pixels may require different erase voltages depending on the preceding pixel colour states. Thus, −15V and/or 0V drive waveform time slices may for example be serially applied on a column line as the rows are scanned (selected) sequentially during each of the FATs of the first phase. As shown in FIGS. 2(a) and (b), each first phase of a drive waveform may have a constant drive level so that the voltage waveform of each pixel achieved by applying the time slices of that drive waveform is substantially constant. (In other embodiments, the first phases may comprise PWM pulses shorter than the e.g. 250 ms, similarly to the third phases). The second phases of the drive waveforms may require a common reset voltage, e.g., −15V, to be continuously applied to all the column lines as the rows are scanned sequentially during each of the FATs of the second phase. In the third phase, time slices of the drive waveforms for respective pixels may be different depending on the desired colour states of the various pixels.

In view of the above, during the second phase, all pixels are being changed similarly, e.g., all changing from white to black, so that there is relatively little change on each column line during this phase as successive rows are scanned. However, the first and third phases of the colour transitions may respectively start and end at different values and/or at different times for different pixels. Therefore the voltages applied to each column during these periods may vary more significantly between successive LATs as drive waveform time slices are applied to successive pixels of a column. Furthermore, there is a large amount of change at the start of the second phase, where every pixel is starting the transition from white to black, and there may further be change(s) at the start of the first and/or third phases.

The touch sensor over the display screen may be equivalent to a metallic grid, for example a square-/rectangular-/diamond-based periodic pattern formed e.g. by etching a conductive material such as indium tin oxide (ITO). Consequently, coupling such as electrostatic (i.e., capacitive) coupling and/or current induced cross-talk coupling between the display screen and the projected capacitance touch sensor may occur. This may disadvantageously cause spurious and/or erroneous touch sense detections to occur. Such detections may be more frequent when voltages applied to points within the display screen are changing to a greater extent or at an increased rate, for example when successively scanned rows are alternately being driven to black and white so that relatively large voltage swings at high data rates are seen on the column electrodes.

Figure 4:
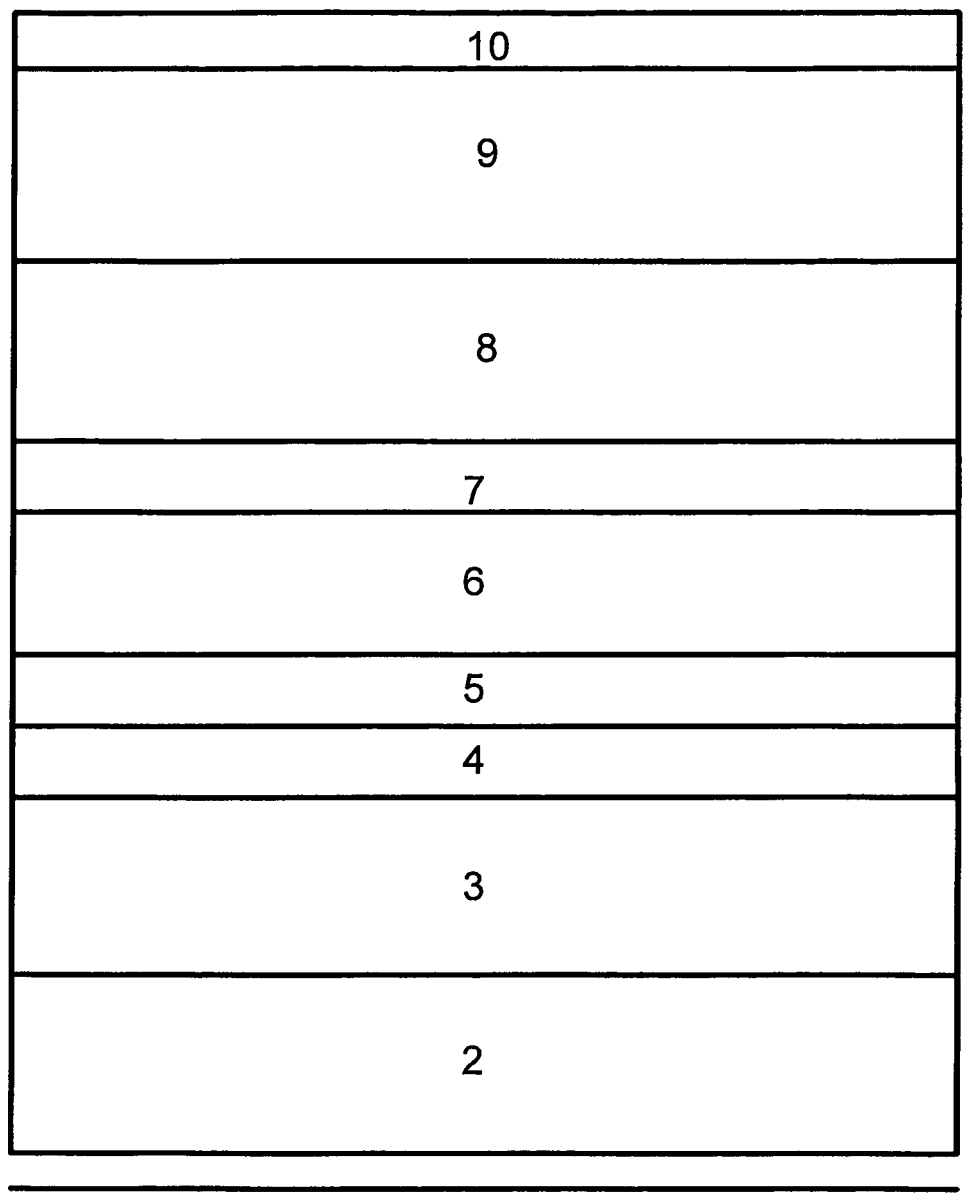
FIG. 4 shows a cross-section of a touch-sensitive display unit of a touch-sensitive display device embodiment that may operate as described in relation to FIGS. 1-3.

The above electrostatic coupling may be understood by considering the touch-sensitive display unit structure of FIG. 4. The structure comprises a window 9 having an anti-glare hard coating 10, the window being mounted over two PET layers 8, 6 having a touch sensor 7 sandwiched between them. The touch sensor may comprise a metallic matrix, e.g., an etched ITO coating. The display screen portion may comprise the display medium 2 having the electrophoretic capsules and being placed between a third PET layer 3 and a backplane 1, and having an encapsulation layer 4 over the PET layer 3. Any neighbouring layers which may be mutually non-integral, e.g., window 9 and PET layer 8, encapsulation layer 4 and PET layer 6, and/or the PET layers 6, 8 separated by the touch sensor, may be joined together by optically clear adhesive layer, e.g., as shown by adhesive layer 5 joining layers 4, 6.

Regarding more specifically the electrical structure of the device, the display medium 2 may have a common top plane ("top plane com"), which may be at the top of medium 2 substantially directly under PET layer 3. Preferably, this top plane is of low impedance and provides a good electrostatic shield. However, where the plane has relatively high resistance, the above coupling, in particular electrostatic coupling, may occur between display screen and touch sensor, e.g., between backplane 1 and touch sensor 7. More specifically, when a voltage at a point on the backplane 1, e.g., on a column electrode, changes, the change may induce corresponding voltage changes in other regions of the display device. Such an induced voltage on the touch sensor may cause an erroneous touch detection, where the touch sensor falsely detects proximity of a user's finger to the touch sensor on the basis of a detected change of projected capacitance.

To reduce instances of erroneous touch detection, it could be considered to place a shield within the device between the touch sensor and display medium. However, an ideal location for such shield is difficult to identify, since a compromise between obscuring of the display screen by the shield and degradation of the touch sensor sensitivity is generally required. The degradation of the touch sensor sensitivity is of concern for example where the touch sensor is close to the shield such that the shield changes the capacitance to the user's finger and thus reduces the touch sensor signal to noise ratio.

Figure 5:
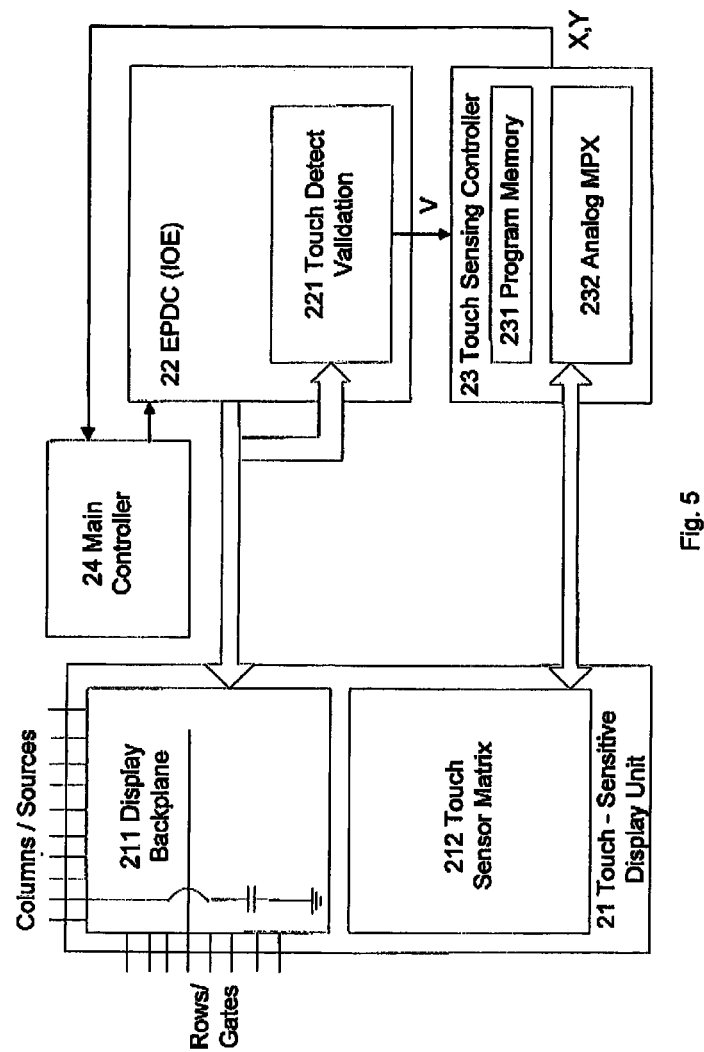
FIG. 5 shows a block diagram of units comprised within the touch-sensitive display device embodiment.

The block diagram of the embodiment as shown in FIG. 5 comprises a touch sensitive display unit 21, main controller (e.g., main device controller such as a CPU) 24, display image controller 22 (e.g. Electronic Paper Display Controller (ePDC)) and touch sensing controller 23. Drive signals for image updating, i.e., for applying to row and column electrodes, are provided to the display backplane 211 by display controller 22. Reading of touch sensors is performed by sensing signals from touch sensor matrix 212 under control of the touch sensing controller 23. A touch detection indication is provided by the touch sensing controller to the main controller and at least indicates the presence/absence of touch and preferably location, e.g. x,y coordinates; of touch. (In modifications of this embodiment, however, the touch sensing controller 23 may be incorporated into the main controller 24 or into the display controller 22).

(Thus, as an example configuration based on FIG. 5 using previously mentioned terms: the touch-sensitive unit 21 comprises a display screen (including backplane 211) and touch projected capacitance touch sensor (touch sensor matrix 212); the display image controller 22 and/or main controller 24 correspond to touch response circuitry; touch sensing controller 23 may correspond to both a touch sensor circuitry and a touch response controller; and touch detect validation unit 221 corresponds to touch validator circuitry).

The display controller 22 and touch sensing controller 23 of FIG. 5 may be separate integrated circuits (ICs), e.g., either or both may be an ASIC, FPGA or other integrated circuit. Moreover, the display controller 22 and touch sensing controller 23 may operate independently and/or asynchronously.

A touch detection validation signal V is provided from touch detect validation circuitry 21 within (or alternatively in separate circuitry located externally to) the display controller 22 to the touch sensing controller 23. The touch detect validation circuitry 21 monitors voltage or data changes of signals applied to the display backplane, specifically voltage levels or data on one or more display screen column electrodes. The touch sensing controller 23 performs repeated reads of the/each electrode of the touch sensor matrix dependent on the validation signal V. For example, the touch sensing controller 23, which may operate according to a program stored in flash memory 231, may read each touch sensor electrode individually in turn, e.g., serially scanning row electrodes and then column electrodes of the touch sensor matrix by means of an analogue multiplexer 232 to obtain X,Y coordinate data.

Each read of a touch sensor electrode may comprise a set-up period and/or a subsequent settle period, before a read period for the actual touch detection. Each such period may be e.g., 80 us. The set-up period reduces the effect of any previous read, e.g., by allowing recharging of the touch sensor matrix. Preferably the multiplexer is configured to allow a brief disconnection of the grid between one or more successive touch sensor electrode readings to recharge the grid and allow time for the grid voltage to settle.

Scanning the entire touch sensor matrix, e.g., 40 touch sensor electrodes to obtain an x,y touch detection indication, may take of the order of 20 ms. Each drive waveform phase may thus cover a plurality of entire touch sensor matrix scans. Therefore, automatically discarding all read outputs from scanning touch sensor electrodes during the first and/or third phases of the capsule drive waveforms may substantially degrade the touch capsule performance, as each phase, e.g., 250 ms is a significant portion of a drive waveform time, e.g. 750 ms.

The embodiment discards a touch sensor electrode reading dependent on what is happening on the column electrodes, e.g., voltage or data changes on one or more column electrodes. Such data changes may be in serial data streams applied simultaneously to a plurality of column electrodes. Thus, a reading may be discarded when a change of voltage/data on column electrode(s) between successive LATs has been predicted and/or detected.

Each read of a touch sensor electrode may occupy a period of, e.g., 80 us and may be performed 3 times by default as described above (set up, settle, actual read). This may be achieved by a Cypress® PSoC touch sensing IC as the touch sensing controller 23. The actual read may be repeated once or a plurality of times, dependent on the touch detection validity signal, a response to an actual read being inhibited where a further, repeated actual read is to occur. Thus, the amount of time during which a response to a touch detection is inhibited may be considerably less than the time of one of the phases (250 ms) referred to above.

To determine the change in voltage or data on the column electrode(s) between successive LATs, the display controller 22, e.g., ePDC, preferably monitors the voltage signals or data applied to all of the column electrodes. This is advantageous compared to looking at a subset of the electrodes, since a voltage applied at any location on the display backplane may induce a voltage at any location across the touch sensor matrix. The display controller 22 may then determine if the current display activity could make the current touch sensor reading not viable. In the present embodiment, this would indicate to the touch sensing controller 23 that a further read of that electrode is required.

Furthermore, repeated readings of the touch sense electrode may be made until the scanning of the display screen column/source electrodes indicates a reduction in or absence of voltage/data changes such that a viable touch sensor electrode reading may now be taken.

The determination of whether a reading may be viable is performed on the basis of a comparison of a change value to a threshold. The change value may be equal to a detected voltage/data change on a column electrode or may be calculated on the basis of changes detected on one or more such electrodes. Preferably, the threshold is determined to preserve good touch sensitivity and zero or low frequency of spurious touch detections. Too many repeated readings and a significant reduction in touch response performance may occur with too low a threshold. Too many spurious responses, e.g. image display updates in response to spurious touch detections, may occur with too high a threshold. An optimum threshold may depend on one or more characteristics of the touch-sensitive display device, e.g., display electrode number and/or density, distance between display backplane and touch sensor, etc.

A change value based on detections from a plurality of column electrodes may be calculated depending on how many of the column/source electrodes changes are detected on (in which case a threshold for example equal to half the number of columns may be employed), and/or depending on a sum of weighting coefficients assigned to each detected change according to the degree of each change, e.g., a change of −15V to +15V and vice versa may be assigned a weighting coefficient of 2, ±15V to 0V and vice versa a weighting coefficient of 1, and no change may be assigned a weighting coefficient of zero. Where a sum of the weighting coefficients across all column/source electrodes is greater than the predetermined threshold, this may result in inhibiting a response to the current touch sense detection. Furthermore, the comparison of the sum to the threshold may result in the touch sensing controller performing a repeated read of the relevant touch sensor electrode. Such further reads may be continued until a sum at or below the threshold is reached and the touch detection validity signal indicates that a touch detection may be valid.

In monitoring to detect the changes, the embodiment may alternatively or additionally determine a change density to determine the change value. In this regard, a detection of large voltage changes over a small area, e.g., a small number of rows, may result in a larger change density volume compared to that determined on the basis of detecting the same number of similar changes over a larger area.

Any change amount determination, e.g. on the basis of density, number of electrodes and/or weighting coefficients, may be performed as a Finite Impulse Response (FIR) analysis, in effect monitoring a subset of signals, the subsets being identified in effect by a window moving in real time across the column electrodes. A serial data stream from the display controller indicating the changes or column electrode voltages/data may lend itself to FIR or IIR type processing.

The embodiment may be advantageous for avoiding/reducing latency, since a touch sensing result is not automatically and regularly discarded during every particular phase of drive waveforms, repeated scans being performed in the embodiment only where this appears necessary on the basis of the detected column electrode changes.

Furthermore, the embodiment advantageously does not need to verify repeatability of every touch sensor detection by automatically repeating every scan/read regardless of any condition existing within the device. Such automatic verification may result in unnecessary discarding of results due the lack of a steady projected capacitance sensor reading from a proximate object. For example, a finger may change the reading between a first read and a verification read, due to variation in pressure exerted by the finger on the display and or/due to a pulse in the user's finger, or by any other means that affects the change in the projected capacitance field.

The embodiment may for example be advantageous where a large screen and a high resolution touch sensor matrix are combined, since there may then be greater scope of coupling between display screen and touch sensor. For example, a touch-sensitive display device having display screen resolution of 960 rows and 1280 columns within an A4 size (e.g. area 8.3×11.7 inches) or US letter (e.g. 8.5×11 inches) display screen and touch sensor resolution of the order of 0.5 mm may advantageously employ the present invention.

In a modification of the embodiment, the touch sensing controller inhibits, rather than discards, a read of one of more touch sensor electrodes until the touch detection validity signal indicates that such a read may be valid. Thus, the read is postponed rather than repeated.

In a further modification of the embodiment, the change on which basis the touch detection validity signal is determined is predicted for example on the basis of image data, rather than monitoring the column electrodes directly.

In a further modification of the embodiment, the display controller may monitor and/or predict the rate of change of column electrode voltage/data to determine the touch detection validity signal, rather than the column electrode drive levels or data as such.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of projected capacitance touch sensing on a display screen, the method comprising:
    updating said display screen by applying a drive waveform to each pixel of the display screen over a plurality of frame periods, wherein a said drive waveform for a pixel defines a transition of the pixel from a current pixel state to an updated pixel state over said plurality of frame periods, and wherein said updating comprises selecting each row of said display screen in turn for a row driving period and driving columns of the display screen with a time slice of drive waveforms for pixels of the row to perform a frame update of said display screen, and repeating said frame update to drive pixels of said display screen with a plurality of successive time slices of said drive waveforms to drive said pixels with said drive waveforms;
    sensing a signal from a projected capacitance touch sensing electrode of said display screen during a sensing interval and using said sensing to provide a touch sensing response;
    calculating a change value for each selected row which indicates the change between column drive levels of said drive waveforms for pixels of each selected row and a row which will be selected next in turn during said updating step;
    generating a column drive row change signal when said change value is greater than a threshold value; and
    inhibiting said touch sensing responsive to said generation of said column drive row change signal during said sensing interval.

2. A method as claimed in claim 1 wherein said calculating comprises calculating a weighted sum of changes in said column drive levels from said one selected row to said next selected row for comparison with said threshold level.

3. A method as claimed in claim 1, wherein said calculating comprises time domain filtering a serialised set of said column drive levels for comparison with said threshold level.

4. A method as claimed in claim 1, wherein said sensing interval has a duration of at least a plurality of said row driving periods, the method further comprising inhibiting said touch sensing response when said column drive row change signal is asserted for any of said row driving periods.

5. A method as claimed in claim 1, wherein said calculating is performed by a circuit performing said updating, and wherein said inhibiting is performed by a processor in a touch sensing circuit sensing said signal from said projected capacitance touch sensing electrode.

6. A method as claimed in claim 1, further comprising repeating said sensing for a further said sensing interval subsequent to said inhibiting.

7. An electronic device having a display screen in combination with a projected capacitance touch sensor over said display screen, the device comprising:
- a display screen driver for updating said display screen by applying a drive waveform to each pixel of the display screen over a plurality of frame periods, wherein a said drive waveform for a pixel defines a transition of the pixel from a current pixel state to an updated pixel state over said plurality of frame periods, wherein said driver is configured to select each row of said display screen in turn for a row driving period and to drive columns of the display screen with a time slice of drive waveforms for pixels of the row to perform a frame update of said display screen, and wherein said driver is further configured to repeat said frame update to drive pixels of said display screen with a plurality of successive time slices of said drive waveforms to drive said pixels with said drive waveforms;
- a touch sensing module for sensing a signal from a projected capacitance touch sensing electrode of said display screen during a sensing interval, said touch sensing module being configured to provide a touch sensing response;
- means for calculating a change value for each selected row which indicates the change between column drive levels of said drive waveforms for pixels for each selected row and a row which will be selected next in turn during said updating step;
- means for generating a column drive row change signal when said change value is greater than a threshold value; and
- means for inhibiting said touch sensing responsive to said generation of said column drive row change signal during said sensing interval.

8. Touch-sensitive display comprising:
- a display screen comprising pixels, at least one column electrode and a plurality of row electrodes;
- a projected capacitance touch sensor over said display screen;
- touch sensor circuitry to read at least one output from said touch sensor to detect touch of said device;
- a display image controller to apply at least one column drive signal to the at least one column electrode over a plurality of frame address times and sequentially select said row electrodes within each said frame address time to update each said pixel from a first state to a second state according to image data;
- touch response circuitry to control said display screen in response to a said touch detection;
- touch validator circuitry to output a touch detection validity signal dependent on said image data, said touch detection validity signal being calculated by calculating a change value for each selected row electrode which indicates the change between the at least one column drive signal for each selected row electrode and a row electrode which will be selected within a said frame address time and generating the touch detection validity signal when said change value is greater than a threshold value; and
- a touch response controller to inhibit a said response by said touch response circuitry to a said touch detected on the basis of said at least one read touch sensor output, said inhibiting in response to generation of said touch detection validity signal.

9. Touch-sensitive display according to claim 8, wherein the or each said change is a change between successive row address times.

10. Touch-sensitive display according to claim 8, wherein said touch validator circuitry is configured to indicate said at least one change on the basis of at least one said column drive signal.

11. Touch-sensitive display according to claim 8, wherein said touch validator circuitry is configured to indicate said at least one change on the basis of said image data.

12. Touch-sensitive display according to claim 8, wherein said touch response controller is configured to trigger a further said read of said touch sensor by said touch sensor circuitry in response to said touch detection validity signal.

13. Touch-sensitive display according to claim 8, wherein said touch validator circuitry is configured to indicate a plurality of changes of the at least one column drive signal, and to output said touch detection validity signal dependent on said plurality of said changes.

14. Touch-sensitive display according to claim 13, wherein said touch validator circuitry is configured to associate a weighting coefficient with each said change and to calculate a value on the basis of said coefficients, the touch validator circuitry further comprising a comparator to compare said calculated value to a threshold and to determine said touch detection validity signal on the basis of said comparison.

15. Touch-sensitive display according to claim 8, wherein said inhibiting of a said response to a said touch detection is of duration less than or substantially equal to one or more said row address times within a said frame address time.

16. Touch-sensitive display according to claim 8, wherein said display screen is an electrophoretic display screen.

17. Touch-sensitive display comprising:
- a display screen comprising pixels, at least one column electrode and a plurality of row electrodes;
- a projected capacitance touch sensor over said display screen;
- touch sensor circuitry to read at least one output from said touch sensor to detect touch of said device;
- a display image controller to apply at least one column drive signal to the at least one column electrode over a plurality of frame address times and sequentially select said row electrodes within each said frame address time to update each said pixel from a first state to a second state according to image data;
- touch response circuitry to control said display screen in response to a said touch detection;
- touch validator circuitry to output a touch detection validity signal dependent on said image data, said touch detection validity signal being calculated by calculating a change value for each selected row electrode which indicates the change between the at least one column drive signal for each selected row electrode and a row electrode which will be selected within a said frame address time and generating the touch detection validity signal when said change value is greater than a threshold value; and
- a touch response controller to delay at least one said read of an output from said touch sensor dependent on said touch detection validity signal.

18. Touch-sensitive display according to claim 17, wherein the or each said change is a change between successive row address times.

19. Touch-sensitive display according to claim 17, wherein said touch validator circuitry is configured to indicate said at least one change on the basis of at least one said column drive signal.

20. Touch-sensitive display according to claim 17, wherein said touch validator circuitry is configured to indicate said at least one change on the basis of said image data.

21. Touch-sensitive display according to claim 17, wherein said touch response controller is configured to trigger said delayed read of said touch sensor by said touch sensor circuitry in response to said touch detection validity signal.

22. Touch-sensitive display according to claim 17, wherein said touch validator circuitry is configured to indicate a plurality of changes of the at least one column drive signal, and to output said touch detection validity signal dependent on said plurality of said changes.

23. Touch-sensitive display according to claim 22, wherein said touch validator circuitry is configured to associate a weighting coefficient with each said change and to calculate a value on the basis of said coefficients, the touch validator circuitry further comprising a comparator to compare said calculated value to a threshold and to determine said touch detection validity signal on the basis of said comparison.

24. Touch-sensitive display according to claim 17, wherein said display screen is an electrophoretic display screen.

\* \* \* \* \*

UNITED STATES PATENT AND TRADEMARK OFFICE
CERTIFICATE OF CORRECTION

PATENT NO. : 9,007,335 B2  
APPLICATION NO. : 13/520333  
DATED : April 14, 2015  
INVENTOR(S) : Cronin et al.

Page 1 of 1

It is certified that error appears in the above-identified patent and that said Letters Patent is hereby corrected as shown below:

On the title page

Item (87), change "WO2012/066304" to --WO2011/080513--.

Item (87), change "May 24, 2012" to --Jul. 7, 2011--.

Item (30) to read:

"Foreign Application Priority Data

Jan. 4, 2010    (GB) .................... 1000023.0"

Signed and Sealed this  
First Day of March, 2016

Michelle K. Lee  
*Director of the United States Patent and Trademark Office*